(12) United States Patent
Maehara et al.

(10) Patent No.: US 8,836,495 B2
(45) Date of Patent: Sep. 16, 2014

(54) WHEEL POSITION IDENTIFYING DEVICE, TRANSMITTER USED FOR THE SAME, AND TIRE PRESSURE DETECTING APPARATUS HAVING THE SAME

(75) Inventors: Hiroaki Maehara, Anjo (JP); Masashi Mori, Obu (JP)

(73) Assignee: Denso Corporation, Kariya (JP)

( * ) Notice: Subject to any disclaimer, the term of this patent is extended or adjusted under 35 U.S.C. 154(b) by 227 days.

(21) Appl. No.: 13/494,300

(22) Filed: Jun. 12, 2012

(65) Prior Publication Data
US 2012/0319831 A1    Dec. 20, 2012

(30) Foreign Application Priority Data
Jun. 15, 2011    (JP) ................................. 2011-133235

(51) Int. Cl.
B60C 23/00    (2006.01)
G08B 21/00    (2006.01)
B60C 23/02    (2006.01)
B60C 23/04    (2006.01)
G01M 17/02    (2006.01)

(52) U.S. Cl.
CPC ............ B60C 23/0416 (2013.01); G01M 17/02 (2013.01); B60C 23/0488 (2013.01)
USPC ........... 340/444; 340/447; 340/442; 340/669; 73/121; 73/146.5

(58) Field of Classification Search
None
See application file for complete search history.

(56) References Cited

U.S. PATENT DOCUMENTS

| | | | |
|---|---|---|---|
| 6,204,758 B1 * | 3/2001 | Wacker et al. | 340/444 |
| 6,259,361 B1 | 7/2001 | Robillard et al. | |
| 6,446,502 B1 * | 9/2002 | Normann et al. | 73/146.5 |
| 6,489,888 B1 * | 12/2002 | Honeck et al. | 340/442 |
| 6,633,229 B1 * | 10/2003 | Normann et al. | 340/447 |
| 6,801,872 B2 * | 10/2004 | Normann et al. | 702/145 |
| 7,010,968 B2 | 3/2006 | Stewart et al. | |
| 7,693,626 B2 * | 4/2010 | Breed et al. | 701/34.4 |
| 7,866,206 B2 * | 1/2011 | Achterholt | 73/146.5 |
| 2003/0042890 A1 * | 3/2003 | Normann et al. | 324/162 |

(Continued)

FOREIGN PATENT DOCUMENTS

JP    2006-142873    6/2006

OTHER PUBLICATIONS

Office Action (1 page) dated Jul. 9, 2013, issued in corresponding Japanese Application No. 2011-133235 and English trnaslation (1 page).
Office Action (1 page) dated Apr. 23, 2013, issued in corresponding Japanese Application No. 2011-133235 and English translation (2 pages).

(Continued)

Primary Examiner — Julie Lieu
(74) Attorney, Agent, or Firm — Nixon & Vanderhye PC

(57) ABSTRACT

In a wheel position identifying device for a vehicle, transmitters are disposed in wheels, respectively. Each of the transmitters has a dual axis acceleration sensor and a control unit. The dual axis acceleration sensor detects a normal-direction acceleration and a tangential-direction acceleration of the wheel associated with the transmitter. The control unit determines whether the wheel associated with the transmitter is a right wheel or a left wheel based on a sign of a product of a time differential value of the normal-direction acceleration and the tangential-direction acceleration, and stores data regarding a determination result in a frame. A receiver receives the frame from each transmitter and identifies a position of the transmitter based on the data stored in the frame. The wheel position identifying device is for example employed to a tire pressure detecting apparatus.

6 Claims, 6 Drawing Sheets

(56) References Cited

U.S. PATENT DOCUMENTS

2004/0155761 A1* 8/2004 Katou ........................... 340/445
2006/0238323 A1* 10/2006 Watabe et al. ................ 340/442
2007/0008097 A1   1/2007 Mori et al.

OTHER PUBLICATIONS

Office Action (5 pages) dated Sep. 17, 2013, issued in corresponding Korean Application No. 10-2012-0063850 and English translation (5 pages).

* cited by examiner

| t | t1 | t2 | t3 | t4 | t5 |
|---|---|---|---|---|---|
| $\sin(\theta+\beta)$ | 0 | 1 | 0 | -1 | 0 |
| $a_{n,left}$ | $\frac{r_r}{r_w}a$ | $\sqrt{a^2+g^2}+\frac{r_r}{r_w}a$ | $\frac{r_r}{r_w}a$ | $-\sqrt{a^2+g^2}+\frac{r_r}{r_w}a$ | $\frac{r_r}{r_w}a$ |

1 ROTATION

WHEEL POSITION IDENTIFYING DEVICE, TRANSMITTER USED FOR THE SAME, AND TIRE PRESSURE DETECTING APPARATUS HAVING THE SAME

CROSS REFERENCE TO RELATED APPLICATION

This application is based on Japanese Patent Application No. 2011-133235 filed on Jun. 15, 2011, the disclosure of which is incorporated herein by reference.

TECHNICAL FIELD

The present disclosure relates to a wheel position identifying device for a vehicle, a transmitter used for the wheel position identifying device, and a tire pressure detecting apparatus using the wheel position identifying device. More particularly, the present disclosure relates to a wheel position identifying device that identifies a position of a wheel associated with a transmitter as left or right, and a direct-type tire pressure detecting apparatus having the wheel position identifying device.

BACKGROUND

Conventionally, a direct-type tire pressure detecting apparatus has been known as an example of a tire pressure detecting apparatus. In the direct-type tire pressure detecting apparatus, a transmitter having a sensing unit such as a pressure sensor is directly fixed to each wheel having a tire, and an antenna and a receiver are fixed to a vehicle body. The receiver receives a detection result of the sensing unit from the transmitter through the antenna, and detects an air pressure of the tire based on the detection result.

In such a direct-type tire pressure detecting apparatus, data transmitted from each transmitter is provided with unique identification (ID) information for identifying that the data is associated with a subject vehicle and for identifying a position of the wheel to which the transmitter is fixed. In the receiver, each ID information and each wheel are correspondingly registered. When receiving a frame including the ID information from the transmitter, the receiver determines the position of the transmitter associated with the wheel, that is, which transmitter the frame is transmitted from based on the registered ID information.

For example, it has been proposed to provide a transmitter with a function as a receiver to perform a two-way communication with the receiver so as to identify a position of a wheel, that is, to identify which wheel the transmitter transmitting the data is fixed to. JP2007-015491A, which corresponds to US2007/0008097A1 and is hereinafter referred to as the patent document 1, describes an example of a wheel position identifying device.

In the wheel position identifying device of the patent document 1, a triggering unit that transmits a trigger signal is mounted on a body of a vehicle at different distances from transmitters. Each of the transmitters measures an intensity of the trigger signal from the triggering unit. Using a principle where the intensity of a radio wave attenuates in accordance with a distance, the position of each wheel is identified based on data indicating the intensity of the trigger signal received in the corresponding transmitter.

JP2006-298182A, which corresponds to US2006/0238323A1 and is hereinafter referred to as the patent document 2, describes another example of a wheel position identifying device. In the described device, a transmitter is provided with a dual axis acceleration sensor (hereinafter referred to as G sensor) that detects accelerations along two axes, such as an acceleration in a direction of rotation of a wheel and an acceleration in a radial direction of the wheel. Because a phase of a detection signal of each axis shifts according to the direction of rotation of the wheel, it is determined whether the transmitter is associated with a left wheel or a right wheel by comparing the phase difference of the detection signals.

SUMMARY

In the wheel position identifying device of the patent document 1, since the position of the wheel is detected using the triggering unit, a cost of the wheel position identifying device will increase due to the triggering unit. In the wheel position identifying device of the patent document 2, it is determined whether the transmitter is associated with a left wheel or a right wheel by calculating the phase difference of the detection signals from the dual axis G sensor. In this case, the amount of calculation is very large. Namely, the acceleration needs to be sampled many times in a short sampling cycle, and thereafter points for the determination (i.e., maximum value, zero value or minimum value) need to be retrieved. Therefore, a relatively large memory capacity is required.

It is an object of the present disclosure to provide a wheel position identifying device capable of determining whether a transmitter is associated with a right wheel or a left wheel without requiring a triggering unit and with a reduced amount of calculation. It is another object of the present disclosure to provide a transmitter used for the wheel position identifying device. It is further another object of the present disclosure to provide a tire pressure detecting apparatus having the wheel position identifying device.

According to an aspect of the present disclosure, a wheel position identifying device for a vehicle includes a plurality of transmitters associated with wheels of the vehicle and a receiver mounted on a body of the vehicle. Each of the transmitters includes a dual axis acceleration sensor and a first control unit. The dual axis acceleration sensor detects a normal-direction acceleration and a tangential-direction acceleration of the wheel associated with the transmitter. The normal-direction acceleration is an acceleration in a direction normal to a circumferential direction of the wheel, and the tangential-direction acceleration is an acceleration in a direction tangential to the circumferential direction of the wheel. The first control unit determines whether the wheel associated with the transmitter is a right wheel or a left wheel based on a sign of a product of a time differential value of the normal-direction acceleration and the tangential-direction acceleration, and stores data regarding a determination result in a frame as wheel position determination data. The receiver includes a receiving antenna, a receiving unit and a second control unit. The receiving unit receives the frame transmitted from each transmitter through the receiving antenna. The second control unit receives the frame from the receiving unit and identifies the position of the wheel associated with the transmitter transmitting the frame as left or right based on the data stored in the frame.

In the above configuration, it is determined whether the position of the wheel associated with the transmitter is left or right based on the sign, such as a positive sign or a negative sign, of the product of the time differential value of the normal-direction acceleration and the tangential-direction acceleration. Therefore, it is not necessary to use a triggering unit for determining the position of the wheel, and it is not necessary to sample acceleration at many points in a short sampling cycle. Accordingly, it can be determined whether the transmitter is associated with the right wheel or the left wheel without using a triggering unit and a computation technique requiring a large number of computations.

According to another aspect of the present disclosure, a transmitter used for a wheel position identifying device is disposed in a wheel of a vehicle. The transmitter includes a dual axis acceleration sensor and a control unit. The dual axial acceleration sensor detects a normal-direction acceleration and a tangential-direction acceleration of the wheel. The normal-direction acceleration is an acceleration in a direction normal to a circumferential direction of the wheel, and the tangential-direction acceleration is an acceleration in a direction tangential to the circumferential direction of the wheel. The control unit determines whether the wheel associated with the transmitter is a right wheel or a left wheel based on a sign of a product of a time differential value of the normal-direction acceleration and the tangential-direction acceleration, and storing data indicating a determination result in a frame as wheel position determination data.

The wheel position identifying device having the above described configuration is, for example, employed to a tire pressure detecting apparatus. In such a case, each of the transmitters includes a sensing unit that generates a detection signal according to a tire pressure of the wheel. The first control unit of the transmitter processes the detection signal generated in the sensing unit into tire pressure information, and stores the tire pressure information in a frame. The second control unit of the receiver receives the frame containing the tire pressure information from the first control unit, and detects the tire pressure of each wheel based on the frame.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, exemplary embodiments of the present disclosure will be described with reference to the drawings.

Figure 1:
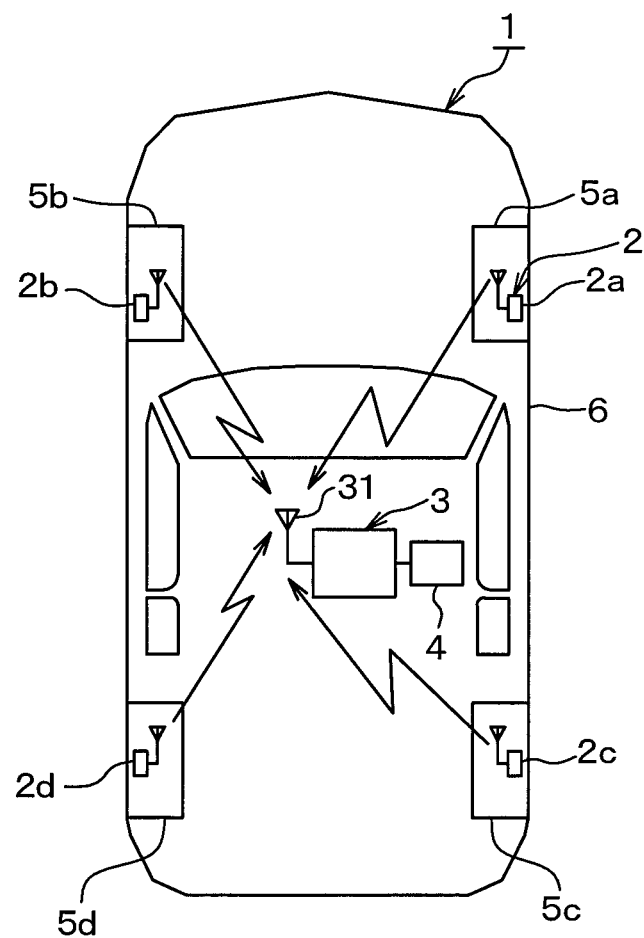
FIG. 1 is a diagram illustrating a schematic structure of a tire pressure detecting apparatus with a wheel position identifying device according to an embodiment of the present disclosure.

Referring to FIG. 1, a tire pressure detecting apparatus to which a wheel position identifying device is employed is mounted in a vehicle 1. In FIG. 1, an up and down direction corresponds to a front and rear direction of the vehicle 1, and a left and right direction corresponds to a left and right direction of the vehicle 1. The tire pressure detecting apparatus includes transmitters 2 (e.g., 2a, 2b, 2c, 2d), a receiver 3 and a display unit 4.

The tire pressure detecting apparatus is mounted in a vehicle having four wheels 5a, 5b, 5c, 5d, for example. The tire pressure detecting apparatus may be mounted in a vehicle having any number of wheels. The transmitters 2a-2d are associated with the wheels 5a-5d, respectively. Each of the transmitters 2a-2d detects an air pressure of a tire of the corresponding wheel 5a-5d, and stores information regarding the air pressure of the tire as a detection result in a frame. The transmitter 2a-2d transmits the frame in a radio frequency (RF) transmission.

Figure 2A:
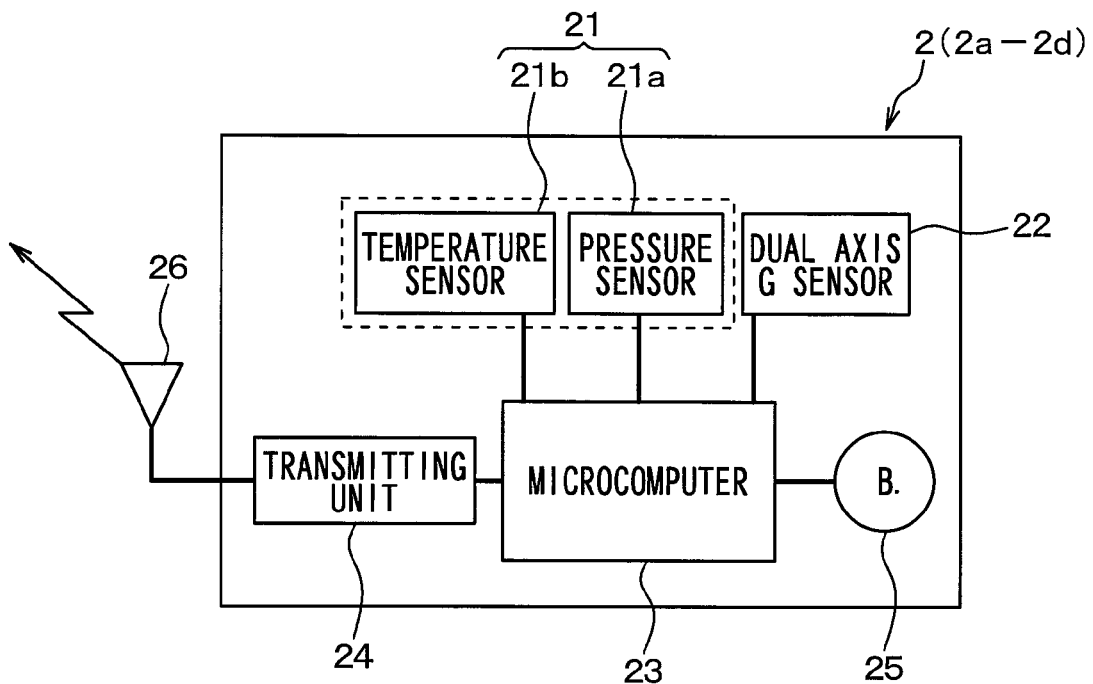
FIG. 2A is a diagram illustrating a schematic structure of each transmitter of the wheel position identifying device according to the embodiment.
Figure 2B:
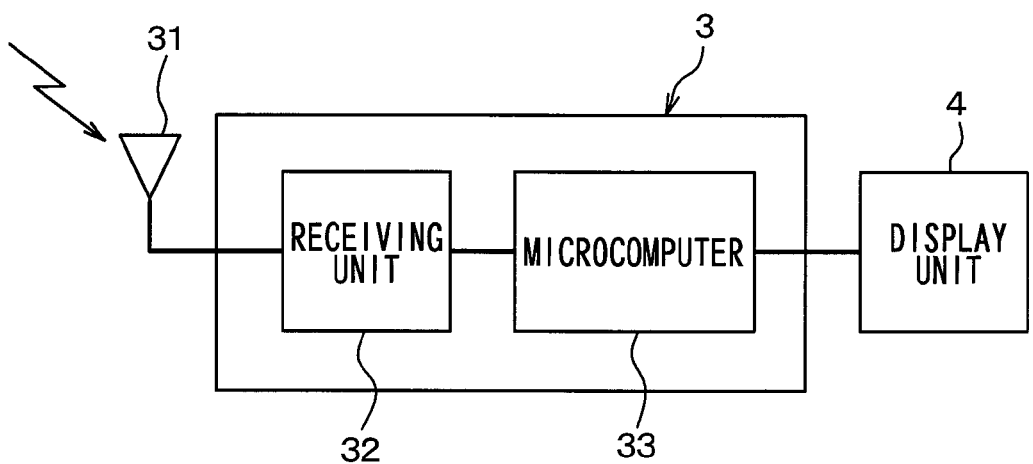
FIG. 2B is a diagram illustrating a schematic structure of a receiver of the wheel position identifying device according to the embodiment.

The receiver 3 is fixed to a body 6 of the vehicle 1. The receiver 3 receives the frame transmitted from each transmitter 2a-2d in the RF transmission. The receiver 3 performs various processes and computations based on the detection result stored in the frame, thereby to identify the position of each wheel and the air pressure of the tire of each wheel. FIG. 2A is a diagram illustrating a schematic structure of each transmitter 2 (2a-2d), and FIG. 2B is a diagram illustrating a schematic structure of the receiver 3.

As shown in FIG. 2A, the transmitter 2 (2a-2d) includes a sensing unit 21, a dual axis acceleration detecting unit (dual axis acceleration sensor) 22, a microcomputer 23, a transmitting unit 24, a battery 25, and a transmission antenna 26. The respective units or portions of the transmitter 2 are driven by electric power supplied from the battery 25.

The sensing unit 21 includes a pressure sensor 21a and a temperature sensor 21b. The pressure sensor 21a is, for example, a diaphragm-type pressure sensor. The sensing unit 21 outputs a detection signal according to an air pressure of the tire and a detection signal according to a temperature.

The acceleration detecting unit 22 is configured to detect acceleration along two axes. The acceleration detecting unit 22 includes a dual axis G sensor including G sensors (first and second sensor parts) 22a, 22b for detecting accelerations in two directions. A function of each G sensor 22a, 22b will be described later in detail.

The microcomputer 23 includes a control unit (first control unit) and the like. The microcomputer 23 has a memory and performs a predetermined process in accordance with a program stored in the memory. The memory of the microcomputer 23 stores individual ID information that contains transmitter identification information specific to the transmitter 2a-2d for identifying each transmitter 2a-2d and vehicle identification information specific to the subject vehicle for identifying the subject vehicle.

The microcomputer 23 receives the detection signal indicative of the tire pressure from the sensing unit 21, and stores information regarding the tire pressure in the frame together with the ID information including the transmitter identification information after processing the detection signal and working on the detection signal as necessary. Also, the microcomputer 23 monitors the detection signals from the G sensors 22a, 22b of a certain period. The microcomputer 23 identifies which wheel the transmitter 2 is associated with, that is, the position of the wheel associated with the transmitter 2 based on the detection signals from the G sensors 22a, 22b.

Specifically, the microcomputer 23 determines whether the transmitter 2 is associated with a right wheel 5a, 5c or a left wheel 5b, 5d, which rotate in opposite directions. Also, the microcomputer 23 determines whether the transmitter 2 is associated with a front wheel 5b, 5d or a rear wheel 5c, 5d. Further, the microcomputer 23 identifies which wheel the transmitter 2 is associated with based on these determination results. In other words, the microcomputer 23 identifies a position of the wheel associated with the transmitter 2.

The microcomputer 23 stores data regarding a detection result of the position of the wheel associated with the transmitter 2 in the frame containing the data regarding the tire pressure. The identification of the wheel position performed by the microcomputer 23 will be described later in detail.

When the microcomputer 23 makes the frame, the microcomputer 23 transmits the frame to the receiver 3 through the transmitting unit 24 and the transmission antenna 26. The transmission of the frame to the receiver 3 is performed in accordance with the above described program. For example, the frame transmission is repeated for every predetermined transmission period.

The transmitting unit 24 serves as an outputting section that transmits the frame provided from the microcomputer 23 to the receiver 3 through the transmission antenna 26. As an example of a radio wave used for the frame transmission, a radio wave in an RF band is used.

The battery 25 is configured to supply electric power to the microcomputer 23 and the like. By the electric power supply from the battery 25, various operations, such as collection of data regarding the tire pressure in the sensing unit 21, detection of accelerations in the acceleration detecting unit 22, and computations in the microcomputer 23 are performed.

For example, the transmitter 2a-2d having the above structure is fixed to an air injection valve of each wheel 5a-5d so that the sensing unit 21 faces the inside of the tire. The air pressure of the corresponding tire is detected by the sensing unit 21, and is stored in the frame by the microcomputer 23. The signal indicative of the tire pressure is periodically transmitted to the receiver 3 by transmitting the frame from the transmission antenna 26 at the predetermined transmission timing.

Figure 3A:
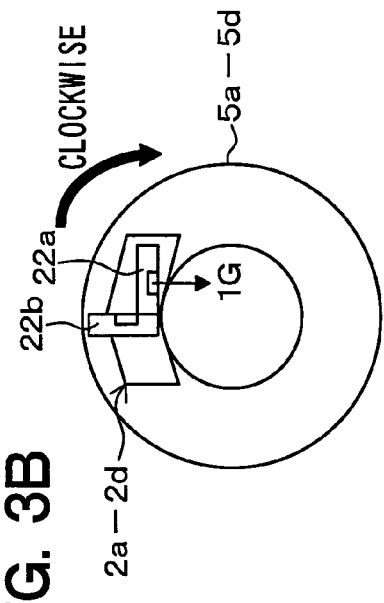
FIGS. 3A and 3B are diagrams illustrating an example of arrangement of an acceleration detecting unit of the transmitter in a wheel according to the embodiment.
Figure 3B:
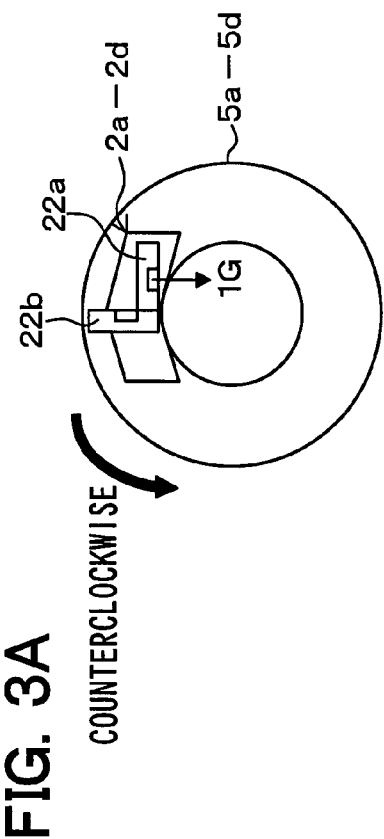
Figure 3C:
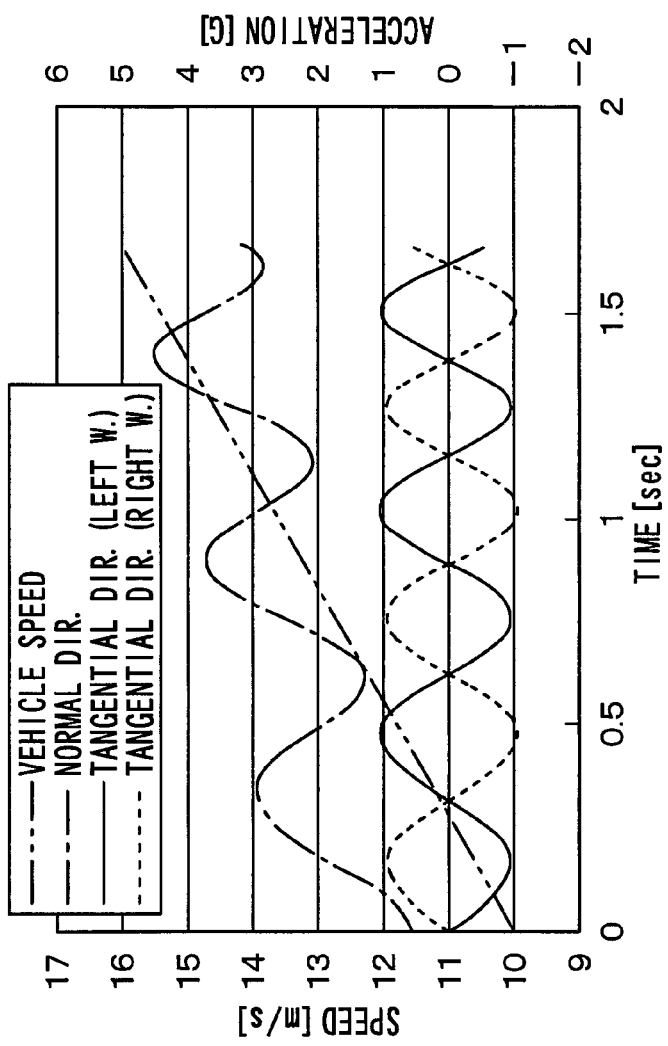
FIG. 3C is a diagram illustrating acceleration waveforms outputted from G sensors of the acceleration detecting unit in the example shown in FIGS. 3A and 3B.

Next, structure and operation of the acceleration detecting unit 22 of each transmitter 2 will be described with reference to FIGS. 3A, 3B and 3C. FIGS. 3A and 3B are diagrams illustrating an example of arrangement of the G sensors 22a, 22b in each wheel 5a-5d. FIG. 3C is a diagram illustrating a relationship between waveforms of accelerations detected by the G sensors 22a, 22b in the example shown in FIGS. 3A and 3B.

The acceleration detecting unit 22 is provided by a dual axis G sensor including the G sensors 22a, 22b for detecting acceleration in different directions. The G sensors 22a, 22b detect acceleration exerting to the wheel 5a-5d during rotation of the wheel 5a-5d. The G sensor 22a is arranged to detect an acceleration along an axis that is perpendicular to a circumferential direction of the wheel 5a-5d, that is, an acceleration in one of two directions that are perpendicular to the circumferential direction of the wheel 5a-5d. Hereinafter, the acceleration detected by the G sensor 22a is referred to as the normal-direction acceleration. The G sensor 22b is arranged to detect an acceleration along an axis that is parallel to a tangential direction of the wheel 5a-5d, that is, an acceleration in one of two directions that are parallel to the tangential direction of the wheel 5a-5d. Hereinafter, the acceleration detected by the G sensor 22b is referred to as the tangential-direction acceleration.

The G sensor 22a detects the normal-direction acceleration of the wheel 5a-5d, and generates an output indicating the centrifugal force plus the acceleration due to gravity. When the transmitter 2 is located at an upper portion of the wheel 5a-5d, the G sensor 22a is applied with a positive acceleration due to gravity. When the transmitter 2 is located at a lower portion of the wheel 5a-5d after the wheel 5a-5d rotates 180 degrees, the G sensor 22a is applied with a negative acceleration due to gravity. As the speed of the vehicle 1 increases, the centrifugal force increases. Therefore, the normal-direction acceleration indicates a waveform in which the acceleration gradually increases due to the increase in the centrifugal force with an amplitude of the acceleration due to gravity. Since the degree of the centrifugal force indicates the value corresponding to the speed of the vehicle, the vehicle speed is also shown in FIG. 3C for reference.

The G sensor 22b detects the tangential-direction acceleration of the wheel 5a-5d, and generates an output according to the acceleration due to gravity. An angle of acceleration detected by the G sensor 22b is offset by 90 degrees from that of the G sensor 22a. Therefore, the phase of the waveform outputted from the G sensor 22b according to the acceleration due to gravity is shifted by 90 degrees from the waveform outputted from the G sensor 22a.

In the example of FIGS. 3A and 3B, when the transmitter 2 is at a position offset from the center of the wheel 5a-5d by 90 degrees in a counterclockwise direction, the acceleration due to gravity is outputted by a negative value. After the wheel 5a-5d rotates 180 degrees, and the transmitter 2 is at a position offset from the center of the wheel 5a-5d by 90 degrees in a clockwise direction, the acceleration due to gravity is outputted by a positive value.

Therefore, as shown in FIG. 3C, the phase of the waveform outputted from the G sensor 22b rotating in the clockwise direction and the phase of the waveform outputted from the G sensor 22b rotating in the counterclockwise direction are different by 180 degrees. In this way, between the wheels 5a-5d rotating in opposite directions, the phase of the outputted waveform is shifted in opposite directions. In a conventional technique, it is determined whether the transmitter 2 is associated with the right wheel 5a, 5c or the left wheel 5b, 5d based on the phase difference. In such a technique, however, the number of computations performed to obtain the phase difference is very large.

In the present embodiment, therefore, the determination whether the transmitter 2 is associated with the right wheel 5a, 5c or the left wheel 5b, 5d is made by the method described hereinafter with reference to FIGS. 4A and 4B.

Figure 4A:
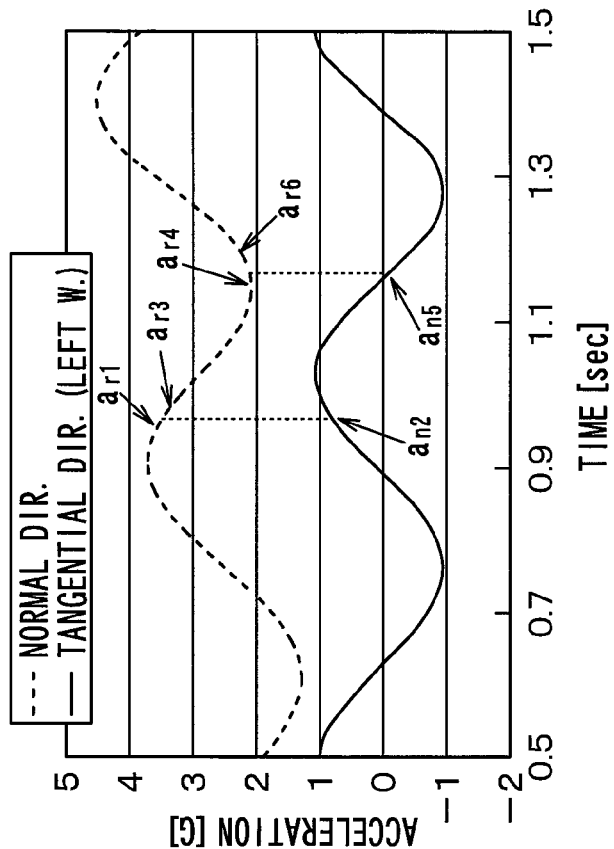
FIG. 4A is a diagram illustrating a waveform of a normal-direction acceleration, a waveform of a tangential-direction acceleration, and a relationship between the normal-direction acceleration and the tangential-direction acceleration at sampling points, with regard to a right wheel, according to the embodiment.

FIG. 4A is a diagram illustrating waveforms of the normal-direction acceleration and the tangential-direction acceleration detected in the transmitter 2 associated with the right wheel 5a, 5c. FIG. 4B is a diagram illustrating waveforms of the normal-direction acceleration and the tangential-direction acceleration detected in the transmitter 2 associated with the left wheel 5b, 5d.

In the present embodiment, it is determined whether the transmitter 2 is associated with the right wheel 5a, 5c or the left wheel 5b, 5d based on the sign of the product of a time differential value of the normal-direction acceleration and the tangential-direction acceleration. The time differential value of the normal-direction acceleration corresponds to the amount of change of the normal-direction acceleration in a minimal time. Therefore, the time differential value is obtained by sampling the normal-direction acceleration at two points in a predetermined time interval and calculating a difference between the two normal-direction accelerations sampled at the two points. Also, the tangential-direction acceleration is sampled during the sampling of the normal-direction acceleration at the two points. Further, the product of the time differential value of the normal-direction acceleration and the tangential-direction acceleration is calculated. Hereinafter, "the product of the time differential value of the normal-direction acceleration and the tangential-direction acceleration" is simply referred to as "the acceleration product".

Figure 4B:
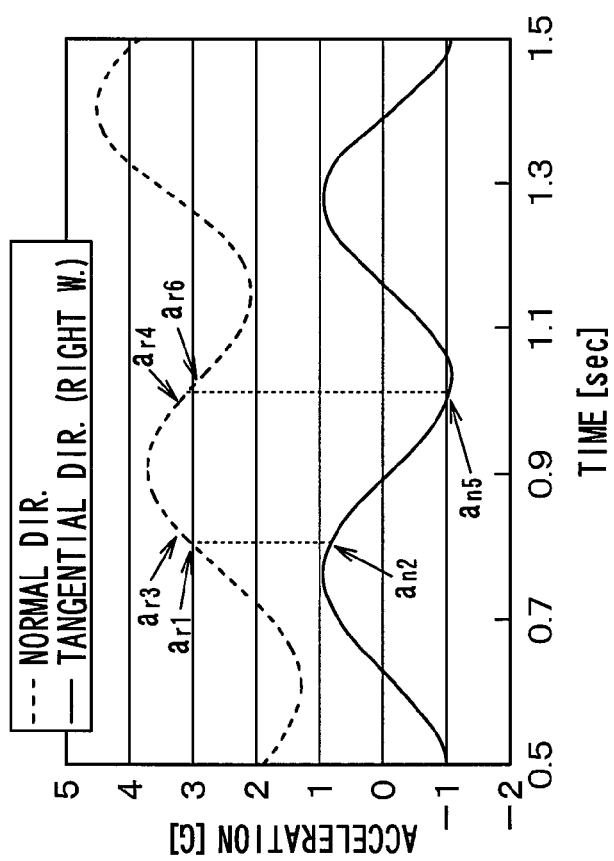
FIG. 4B is a diagram illustrating a waveform of a normal-direction acceleration, a waveform of a tangential-direction acceleration, and a relationship between the normal-direction acceleration and the tangential-direction acceleration at sampling points, with regard to a left wheel, according to the embodiment.

FIGS. 4A and 4B illustrate two examples of the sampling. In one example, the normal-direction acceleration is sampled at points ar1 and ar3 and the tangential-direction acceleration is sampled at a point an2. In the other example, the normal-direction acceleration is sampled at points ar4 and ar6, and the tangential-direction acceleration is sampled at a point an5.

In both the examples, the following relationships are satisfied. In the case where the transmitter 2 is associated with the right wheel 5a, 5c, the sign of the acceleration product is the positive sign. In the case where the transmitter 2 is associated with the left wheel 5b, 5d, the sign of the acceleration product is the negative sign.

Namely, in the case where the transmitter 2 is associated with the right wheel 5a, 5c, as shown in FIG. 4A, while the normal-direction acceleration is increasing, the difference between the two normal-direction accelerations ar1 and ar3 (i.e., ar3−ar1) has a positive value, and the tangential-direction acceleration an2 has a positive value. Therefore, the sign of the acceleration product is the positive sign. (i.e., (ar3−ar1)×an2>0) While the normal-direction acceleration is decreasing, the difference between the two normal-direction accelerations ar4 and ar6 (i.e., ar6−ar4) has a negative value, and the tangential-direction acceleration ar5 has a negative value. Therefore, the sign of the acceleration product is the positive sign. (i.e., (ar6−ar4)×an5>0)

In the case where the transmitter 2 is associated with the left wheel 5b, 5d, as shown in FIG. 4B, while the normal-direction acceleration is decreasing, the difference between the two normal-direction accelerations ar1 and ar3 (i.e., ar3−ar1) has a negative value, and the tangential-direction acceleration an2 has a positive value. Therefore, the sign of the acceleration product is the negative sign. (i.e., (ar3−ar1)×an2<0) While the normal-direction acceleration is increasing, the difference between the two normal-direction accelerations ar4 and ar6 (i.e., ar6−ar4) has a positive value, and the tangential-direction acceleration an5 has a negative value. Therefore, the sign of the acceleration product is the negative sign. (i.e., (ar6−ar4)×an5<0)

Figure 5:
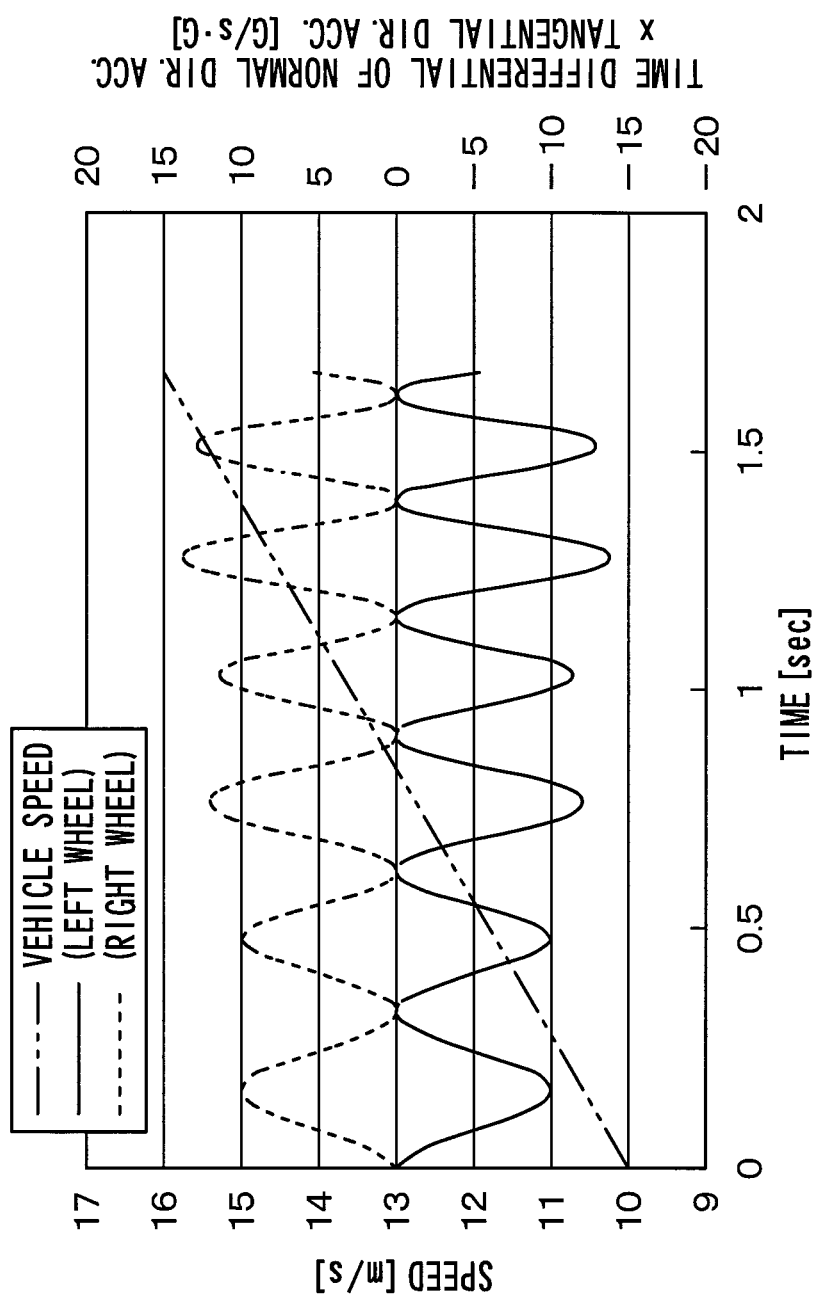
FIG. 5 is a diagram illustrating a waveform provided by a product of a time differential value of the normal-direction acceleration and the tangential-direction acceleration according to the embodiment.

FIG. 5 is a diagram illustrating the waveform of the acceleration product relative to time with regard to the transmitter 2 associated with the right wheel 5a, 5c and the waveform of the acceleration product relative to time with regard to the transmitter 2 associated with the left wheel 5b, 5d.

As shown in FIG. 5, in the case where the transmitter 2 is in the right wheel 5a, 5c, although the acceleration product becomes instantly zero, the acceleration product is typically on a positive side. In the case where the transmitter 2 is in the left wheel 5b, 5d, although the acceleration product becomes instantly zero, the product is typically on a negative side.

As described above, it can be determined whether the wheel associated with the transmitter 2 is the right wheel 5a, 5c or the left wheel 5b, 5d based on the sign of the acceleration product.

Also, the microcomputer 23 determines whether the wheel associated with the transmitter 2 is the front wheel (both the front wheels) 5a, 5b or the rear wheel (both the rear wheels) 5c, 5d. Although this determination may be made by any known method, this determination is for example made by the following method in the present embodiment.

For example, a change of an effective tire radius is determined with regard to a vehicle accelerating state, a vehicle constant speed state where the speed of the vehicle is constant and a vehicle decelerating state based on the detection result of the acceleration detecting unit 22, and it is determined whether the wheel associated with the transmitter 2 is the front wheel 5a, 5b or the rear wheel 5c, 5d based on the effective radius of the tire.

The vehicle 1 experiences a pitching motion according to an acceleration state during traveling. The effective radius of the tire varies according to a state of the pitching motion. Namely, in the vehicle accelerating state, nose lift where a front part (nose) of the vehicle rises occurs. In the vehicle decelerating state, nosedive where the front part of the vehicle comes down occurs.

Therefore, in the vehicle accelerating state, the effective radius of the tire of the front wheels 5a, 5b is greater than that of the rear wheels 5b, 5d. In the vehicle decelerating state, on the other hand, the effective radius of the tire of the front wheels 5a, 5b is smaller than that of the rear wheels 5b, 5d.

As such, it can be determined whether the wheel associated with the transmitter 2 is the front wheel 5a, 5b or the rear wheel 5c, 5d by calculating the effective radius of the tire. The effective radius of the tire is calculated using the detection signal from the acceleration detecting unit 22.

Figures 6A, 6B:
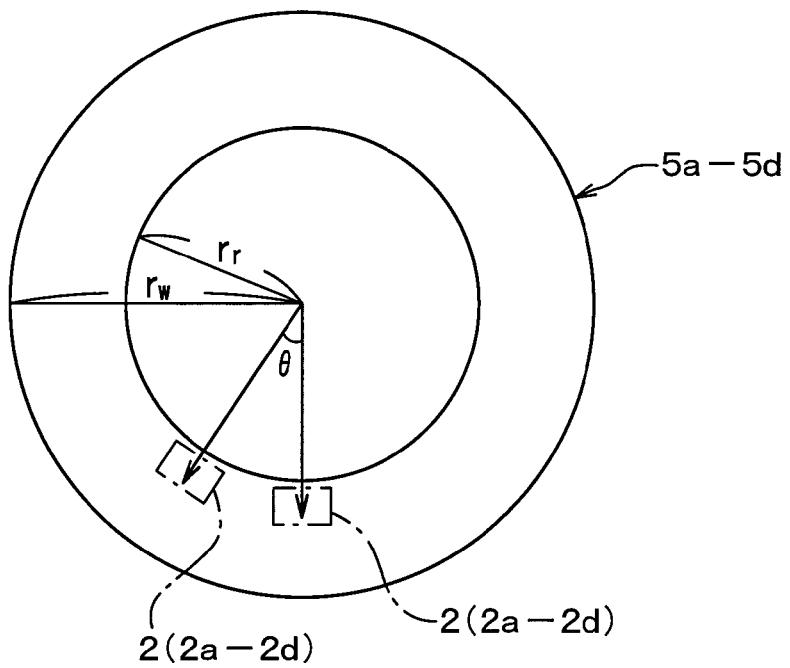
FIG. 6A is a diagram illustrating a relationship between a position of the transmitter and an acceleration applied to the transmitter at each timing during one rotation of a wheel according to the embodiment.
FIG. 6B is a diagram illustrating a schematic view of the wheel for explaining a position of the transmitter during the rotation of the wheel according to the embodiment.

FIG. 6A is a diagram illustrating a relationship between a position of the transmitter 2 and an acceleration applied to the transmitter 2 during one rotation (turn) of the wheel 5a-5d. FIG. 6B is a diagram illustrating a schematic view of the wheel 5a-5d for explaining a position of the transmitter 2. It is to be noted that, in FIG. 6A, the acceleration is shown with regard to the transmitter 2 associated with the left wheel 5b, 5d.

As shown in FIG. 6A, the position of the transmitter 2 is expressed by $\sin(\theta+\beta)$. As shown in FIG. 6B, when the transmitter 2 is positioned at the lower portion of the wheel 5a-5d, the position of the transmitter 2 is defined as "$\sin(\theta+\beta)=0$". As the position of the transmitter 2 varies with the rotation of the wheel 5a-5d, the value of $\sin(\theta+\beta)$ varies to "1", "0", "−1" by every angle of 90 degrees during the rotation. Thus, the tangential-direction acceleration $a_{n,left}$ is shown at every timing t1 to t5 where the position of the transmitter 2 varies every angle of 90 degrees in the direction of rotation of the wheel 5a-5d.

With regard to the transmitter 2 associated with the left wheel 5b, 5d, the tangential-direction acceleration $a_{n,left}$ is expressed by an expression 1. In the expression 1, "a" denotes an acceleration of the vehicle 1, "g" denotes an acceleration due to gravity, and "θ" denotes an angle of the transmitter 2 relative to the transmitter 2 positioned at the lower portion of the wheel 5a-5d. Also, in the expression 1, β satisfies a relation defined by an expression 2.

$$a_{n,left} = \sqrt{a^2 + g^2} \sin(\theta + \beta) + \frac{r_r}{r_w} a \qquad \text{Expression 1}$$

$$\cos\beta = \frac{g}{\sqrt{a^2 + g^2}}, \sin\beta = \frac{-a}{\sqrt{a^2 + g^2}} \qquad \text{Expression 2}$$

The tangential-direction acceleration $a_{n,left}$ is maximum at the timing t2 and is minimum at the timing t4 during one turn of the wheel 5a-5d. The difference between the maximum value and the minimum value of the tangential-direction acceleration $a_{n,left}$ is expressed by an expression 3. Further, an expression 4 is introduced by transforming the expression 3 into an expression of acceleration.

$$a_{n,left}(t_2) - a_{n,left}(t_4) = 2\sqrt{a^2 + g^2} \qquad \text{Expression 3}$$

$$a = \pm \sqrt{\left(\frac{a_{n,left}(t_2) - a_{n,left}(t_4)}{2}\right)^2 - g^2} \qquad \text{Expression 4}$$

The sum of the maximum value and the minimum value of the tangential-direction acceleration $a_{n,left}$ during one turn of the wheel 5a-5d is expressed by an expression 5. Further, an expression 6 is introduced by transforming the expression 5. In the expressions 5 and 6, "$r_r$" denotes a radius of rotation of the transmitter 2, and "$r_w$" denotes a radius of rotation of the tire.

$$a_{n,left}(t_2) + a_{n,left}(t_4) = 2a\frac{r_r}{r_w} \qquad \text{Expression 5}$$

$$\frac{r_r}{r_w} = \frac{a_{n,left}(t_2) + a_{n,left}(t_4)}{2a} \qquad \text{Expression 6}$$

The expression 4 expresses the acceleration of the vehicle 1. When the acceleration of the vehicle 1 indicates a positive value, that is, the sign is the positive sign, the vehicle 1 is in the accelerating state. When the acceleration of the vehicle 1 indicates a negative value, that is, the sign is the negative sign, the vehicle 1 is in the decelerating state. The expression 6 expresses a ratio of the radius of rotation of the transmitter 2 to the radius of rotation of the tire (hereinafter referred to as the ratio $r_r/r_w$).

The ratio $r_r/r_w$ varies in accordance with the acceleration state (traveling state) of the vehicle even in the same wheel. Specifically, in the vehicle accelerating state, the effective radius of the tire of the front wheels 5a, 5b increases and the effective radius of the tire of the rear wheels 5c, 5d reduces due to the nose lift. In the vehicle decelerating state, on the other hand, the effective radius of the tire of the front wheels 5a, 5b reduces and the effective radius of the tire of the rear wheels 5c, 5d increases due to the nosedive.

Therefore, the acceleration state of the vehicle 1 and data of the ratio $r_r/r_w$ are memorized for multiple times at every sampling, and the ratio $r_r/r_w$ in the vehicle accelerating state and the ratio $r_r/r_w$ in the vehicle decelerating state are compared with each other based on the accumulated stored contents, for example. When the ratio $r_r/r_w$ in the vehicle accelerating state is smaller than that in the vehicle decelerating state, it is determined that the transmitter 2 is associated with one of the front wheels 5a, 5b. When the ratio $r_r/r_w$ in the vehicle accelerating state is greater than that in the vehicle decelerating state, it is determined that the transmitter 2 is associated with one of the rear wheels 5c, 5d. In this way, it can be determined whether the wheel associated with the transmitter 2 is the front wheel 5a, 5b or the rear wheel 5c, 5d.

In the above determination whether the transmitter 2 is associated with the front wheel 5a, 5b or the rear wheel 5c, 5d, although the G sensor 22b for detecting the tangential-direction acceleration needs to have higher accuracy, a dynamic range of the G sensor 22b may be small as long as the acceleration state of the vehicle can be sensed accurately. Namely, the detection accuracy of the G sensor 22b can be set higher than that of the G sensor 22a by setting the dynamic range of the G sensor 22b smaller than that of the G sensor 22a.

Although the tangential-direction acceleration is detected in every sampling cycle during one turn of the wheel 5a-5d, the tangential-direction acceleration needs to be detected at least in one turn of the wheel 5a-5d. In the technique based on the calculation of the phase difference, because there are two cases, that is, one case where the difference between the normal-direction acceleration and the tangential-direction acceleration is −90 degrees, and the other case where the difference is +90 degrees, the detection results sampled for at least continuous 1.5 turn are required. In the detection technique of the present embodiment, on the other hand, the required memory and the number of calculations can be reduced.

As described above, it can be determined whether the transmitter 2 is associated with the right wheel 5a, 5b or the left wheel 5b, 5d, and whether the transmitter 2 is associated with the front wheel 5a, 5b or the rear wheel 5c, 5d. Accordingly, it is possible to identify the position of the wheel associated with the transmitter 2, that is, which wheel 5a-5d the transmitter 2 is associated with.

The receiver 3 includes an antenna (receiving antenna) 31, a receiving unit 32 and a control unit 33.

The antenna 31 is a single common antenna that can commonly receive frames from the transmitters 2. The antenna 31 is fixed to the body 6.

The receiving unit 32 serves as an inputting unit that receives the frames transmitted from the transmitters 2 through the antenna 31 and transmits the frames to the control unit 33.

The microcomputer 33 includes a CPU, a ROM, a RAM, an I/O and the like. The microcomputer 33 performs a predetermined process in accordance with a program stored in the ROM and the like.

The microcomputer 33 performs wheel position identification for identifying the position of each transmitter 2, that is, which wheel 5a-5d each transmitter 2 is associated with by executing a wheel position detecting process using the frames transmitted from the transmitters 2a-2d in accordance with the program stored in the memory. Namely, the microcomputer 33 reads out the data stored in each frame, the data indicating the result of the wheel position detection in which the position of the wheel associated with the transmitter 2 is detected.

The microcomputer 33 stores the ID information of each transmitter 2a-2d and the position of each wheel 5a-5d associated with the transmitter 2a-2d, while correlating the ID information of each transmitter 2a-2d to the position of the wheel 5a-5d, based on the data indicating the result of the wheel position detection.

Thereafter, when the frame is transmitted from each transmitter 2a-2d, the microcomputer 33 performs the detection of the tire pressure of each wheel 5a-5d by identifying which transmitter 2a-2d the frame is transmitted from based on the ID information and the data regarding the tire pressure stored in the transmitted frame.

The display unit 4 is disposed at a location where can be viewed from a driver, as shown in FIG. 1. For example, the display unit 4 is provided by a warning lamp disposed in an instrument panel. When the display unit 4 receives a signal indicating that the air pressure of any tire is lower than a predetermined level from the control unit 33 of the receiver 3, the display unit 4 displays the warning to notify the driver of the decrease of the tire pressure.

As described above, in the present embodiment, it is determined whether the wheel associated with the transmitter 2 is the right wheel 5a, 5c or the left wheel 5b, 5d based on the sign, such as the positive sign or the negative sign, of the acceleration product of the time differential value of the normal-direction acceleration and the tangential-direction acceleration. Therefore, a triggering unit is not necessary. Also, it is not necessary to sample the acceleration at many points in a short sampling cycle.

Accordingly, the position of the transmitter 2 as in the right wheel 5a, 5c or the left wheel 5b, 5d can be identified without requiring the triggering unit and using the technique employing the large amount of computations as the calculation of the phase difference of the detection signals of the dual axis G sensor.

OTHER EMBODIMENTS

In the above described exemplary embodiment, the antenna 31 is provided as a single antenna commonly used for the multiple transmitters 2 (2a-2d), that is, for the wheels 5a-5d. Alternative to the single antenna 31, multiple antennas, such as four antennas, may be used for the respective transmitters 2 (2a-2d). It is to be noted that it is difficult to specify the position of the wheel 5a-5d associated with the transmitter 2 in a case where the antenna 31 is commonly used between the transmitters 2 (2a-2d). Therefore, the above described exemplary embodiment is effectively used in the case where the antenna 31 is commonly used between the multiple transmitters 2 (2a-2d).

In the above described exemplary embodiment, the wheel position identifying device is employed to the tire pressure detecting apparatus. Therefore, the data indicating the result of the wheel position detection is stored in the frame in which the information regarding the tire pressure is stored and is transmitted to the receiver 3. However, this configuration is an example, and the data indicating the result of the wheel position detection may be stored in a frame different from the frame in which the information regarding the tire pressure is stored. In the case where the data indicating the result of the wheel position detection is stored in the frame in which the information regarding the tire pressure is stored, the frame can be commonly used for both the identification of the wheel position and the detection of the tire pressure.

An example of a method of determining whether the transmitter 2 is associated with the front wheel 5a, 5b or the rear wheel 5c, 5d has been described hereinabove. However, the determination whether the transmitter 2 is associated with the front wheel 5a, 5b or the rear wheel 5c, 5d may be made by any other method. In the above described determination method, the ratio of the effective radius of the tire to the rotation radius of the transmitter 2 and the acceleration state are calculated based on the tangential-direction acceleration, and it is determined whether the transmitter 2 is in the front wheel 5a, 5b or in the rear wheel 5c, 5d based on the ratio and the acceleration state.

Such a determination technique is an example, and the determination whether the transmitter 2 is associated with the front wheel 5a, 5b or the rear wheel 5c, 5d may be made simply based on the effective radius of the tire and the acceleration state. For example, an arrangement position of each transmitter 2 is fixed in the wheels, and the radius of rotation of each transmitter 2 is fixed. Therefore, the effective radius of the tire can be obtained by calculating the ratio of the effective radius of the tire and the radius of rotation of the transmitter 2 based on the tangential-direction acceleration. It may be possible to determine whether the transmitter 2 is associated with the front wheel 5a, 5b or the rear wheel 5c, 5d based on the effective radius of the tire and the acceleration state.

Summarizing the above description, as an embodiment, the wheel position identifying device includes the transmitters 2 (2a-2d) respectively associated with the wheels 5a-5d of the vehicle 1 and the receiver 3 mounted on the body 6 of the vehicle. Each of the transmitters 2 (2a-2d) includes the dual axis acceleration sensor 22 and the first control unit (microcomputer) 23. The dual axis acceleration sensor 22 detects the normal-direction acceleration and the tangential-direction acceleration of the wheel associated with the transmitter 2 (2a-2d). The first control unit (23) determines whether the wheel 5a-5d associated with the transmitter 2 (2a-2d) is a right wheel 5a, 5c or a left wheel 5b, 5d based on a sign of a product of a time differential value of the normal-direction acceleration and the tangential-direction acceleration, and stores data regarding the determination result in the frame as the wheel position determination data. The receiver 3 includes the receiving antenna 31, the receiving unit 32 and the second control unit (microcomputer) 33. The receiving unit 32 receives the frame transmitted from each transmitter 2 (2a-2d) through the receiving antenna 31. The second control unit 33 receives the frame from the receiving unit 32 and determines whether the transmitter 2 (2a-2d) transmitting the frame is the right wheel 5a, 5c or the left wheel 5b, 5d based on the data stored in the frame.

In an embodiment, the first control unit 23 further determines whether the wheel 5a-5d is a front wheel 5a, 5b or a rear wheel 5c, 5d based on the acceleration state of the wheel 5a-5d whether the wheel 5a-5d is in an accelerating state or in a decelerating state and the effective radius of the tire of the wheel obtained from the tangential-direction acceleration, and establishes the position of the wheel 5a-5d as front right, front left, rear right, or rear left based on the determination result indicating the position of the wheel 5a-5d as left or right and a determination result indicating the position of the wheel 5a-5d as front or rear. The first control unit 23 stores an established position of the wheel 5a-5d in the frame as the wheel position determination data.

The wheel position identifying device according to these embodiments is for example employed to the tire pressure detecting apparatus. In such a case, each of the transmitters 2a-2d includes the sensing unit 21 that generates a detection signal according to a tire pressure of the wheel. The first control unit 23 of the transmitter 2 processes the detection signal generated in the sensing unit 21 into tire pressure information, and stores the tire pressure information in a frame. The second control unit 33 of the receiver 3 receives the frame containing the tire pressure information from the first control unit 23, and detects the tire pressure of each wheel 5a-5d based on the frame.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A wheel position identifying device for a vehicle, comprising:
   a plurality of transmitters associated with wheels of the vehicle, respectively, each of the transmitters including:
      a dual axis acceleration sensor detecting a normal-direction acceleration and a tangential-direction acceleration of the wheel associated with the transmitter, the normal-direction acceleration being an acceleration in a direction normal to a circumferential direction of the wheel, the tangential-direction acceleration being an acceleration in a direction tangential to the circumferential direction of the wheel; and
      a first control unit determining whether the wheel associated with the transmitter is a right wheel or a left wheel based on a sign of a product of a time differential value of the normal-direction acceleration and the tangential-direction acceleration, and storing data regarding a determination result in a frame as wheel position determination data; and
   a receiver mounted on a body of the vehicle, the receiver including:
      a receiving antenna;
      a receiving unit receiving the frame transmitted from each transmitter through the receiving antenna; and
      a second control unit receiving the frame from the receiving unit and determining whether the transmitter transmitting the frame is associated with the right wheel or the left wheel based on the data stored in the frame; wherein
   the first control unit determines whether the wheel associated with the transmitter is a front wheel or a rear wheel based on an acceleration state of the wheel whether the wheel is in an accelerating state or in a decelerating state and an effective radius of a tire of the wheel obtained from the tangential-direction acceleration, and
   the first control unit establishes a position of the wheel as front right, front left, rear right, or rear left based on the determination result indicating whether the wheel is the right wheel or the left wheel and a determination result indicating whether the wheel is the front wheel or the rear wheel, and
   the first control unit stores an established position of the wheel in the frame as the wheel position determination data.

2. The wheel position identifying device according to claim 1, wherein
   the dual axis acceleration sensor includes a first sensor part that detects the normal-direction acceleration and a second sensor part that detects the tangential-direction acceleration, and
   the second sensor part is configured to have a dynamic range smaller than that of the first sensor part so that the second sensor part has detection accuracy higher than that of the first sensor part.

3. A tire pressure detecting apparatus comprising the wheel position identifying device according to claim 1, wherein
   each of the transmitters includes a sensing unit that generates a detection signal according to a tire pressure of the wheel,
   the first control unit processes the detection signal generated in the sensing unit into tire pressure information, and stores the tire pressure information in a frame, and
   the second control unit of the receiver receives the frame containing the tire pressure information from the first control unit, and detects the tire pressure of each wheel based on the frame.

4. The tire pressure detecting apparatus according to claim 3, wherein
   the first control unit stores the tire pressure information and the wheel position determination data in the same frame.

5. A transmitter used for a wheel position identifying device for a vehicle, the transmitter being associated with a wheel of the vehicle, the transmitter comprising:
   a dual axis acceleration sensor detecting a normal-direction acceleration and a tangential-direction acceleration of the wheel, the normal-direction acceleration being an acceleration in a direction normal to a circumferential direction of the wheel, the tangential-direction acceleration being an acceleration in a direction tangential to the circumferential direction of the wheel; and
   a control unit determining whether the wheel is a right wheel or a left wheel based on a sign of a product of a time differential value of the normal-direction acceleration and the tangential-direction acceleration, and storing data indicating a determination result in a frame as wheel position determination data; wherein
   the control unit determines whether the wheel is a front wheel or a rear wheel based on an acceleration state of the wheel whether the wheel is in an accelerating state or in a decelerating state and an effective radius of a tire of the wheel obtained from the tangential-direction acceleration, and
   the control unit establishes a position of the wheel as front right, front left, rear right, or rear left based on the determination result indicating whether the wheel is the right wheel or the left wheel and a determination result indicating whether the wheel is the front wheel or the rear wheel, and
   the control unit stores an established position of the wheel in the frame as the wheel position determination data.

6. The transmitter according to claim 5, wherein
   the dual axis acceleration sensor includes a first sensor part that detects the normal-direction acceleration and a second sensor part that detects the tangential-direction acceleration, and
   the second sensor part is configured to have a dynamic range smaller than that of the first sensor part so that the second sensor part has detection accuracy higher than that of the first sensor part.

* * * * *